Aug. 11, 1953     W. H. SILVER ET AL     2,648,270
DISK PLOW WHEELED FRAME
Filed April 18, 1947     5 Sheets-Sheet 1
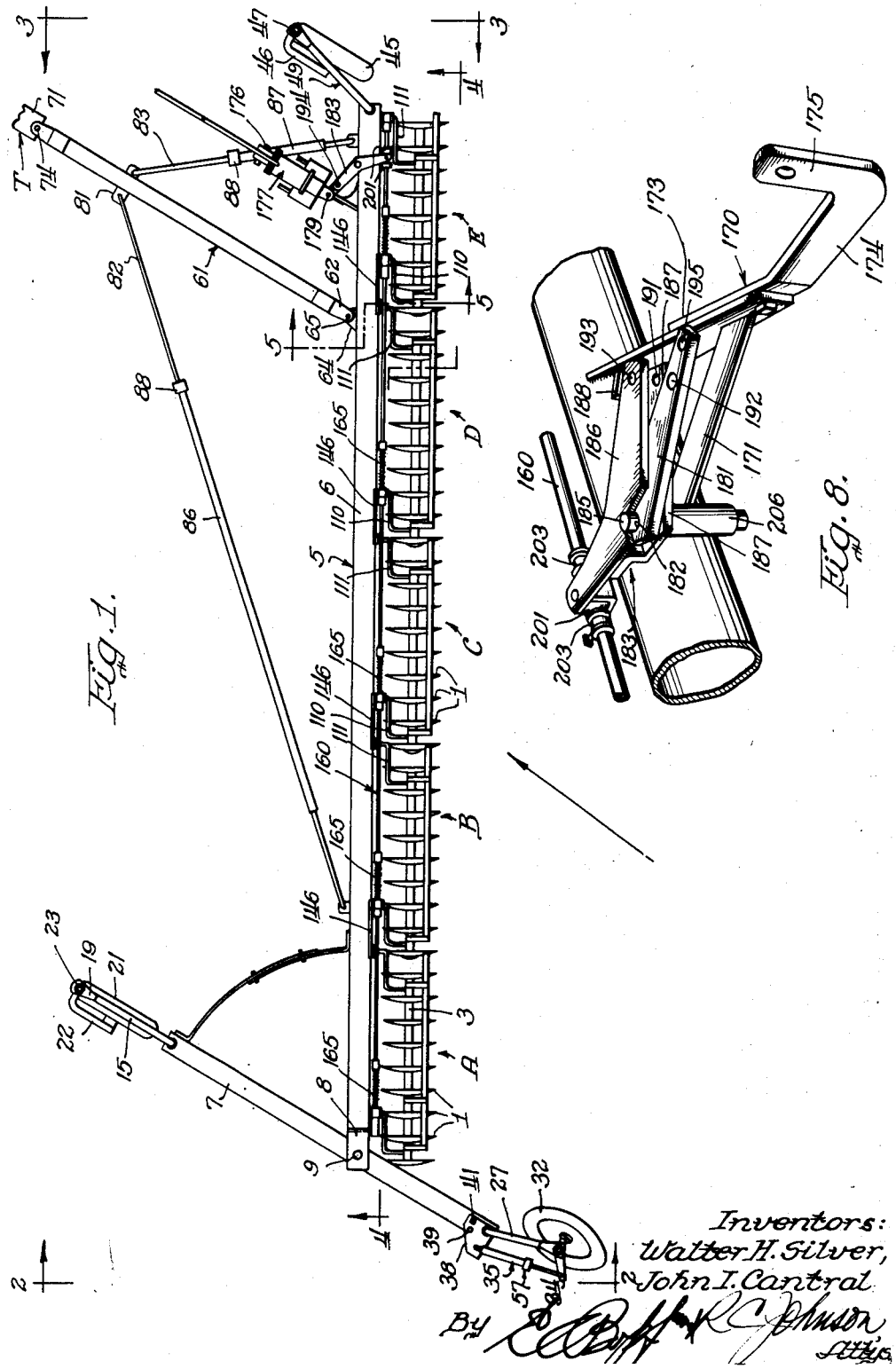
Inventors:
Walter H. Silver,
John I. Cantral

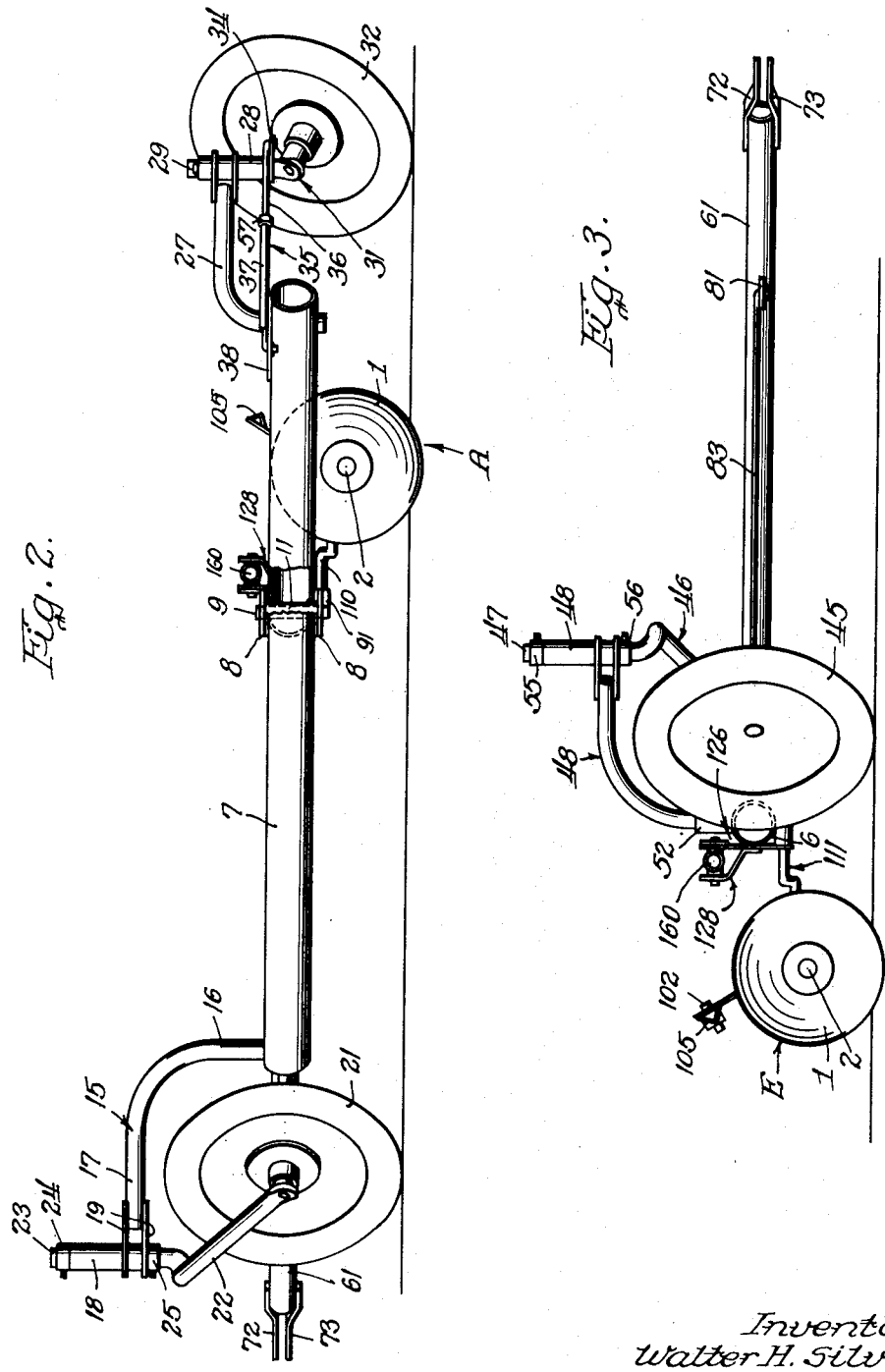

Aug. 11, 1953    W. H. SILVER ET AL    2,648,270
DISK PLOW WHEELED FRAME
Filed April 18, 1947    5 Sheets-Sheet 3
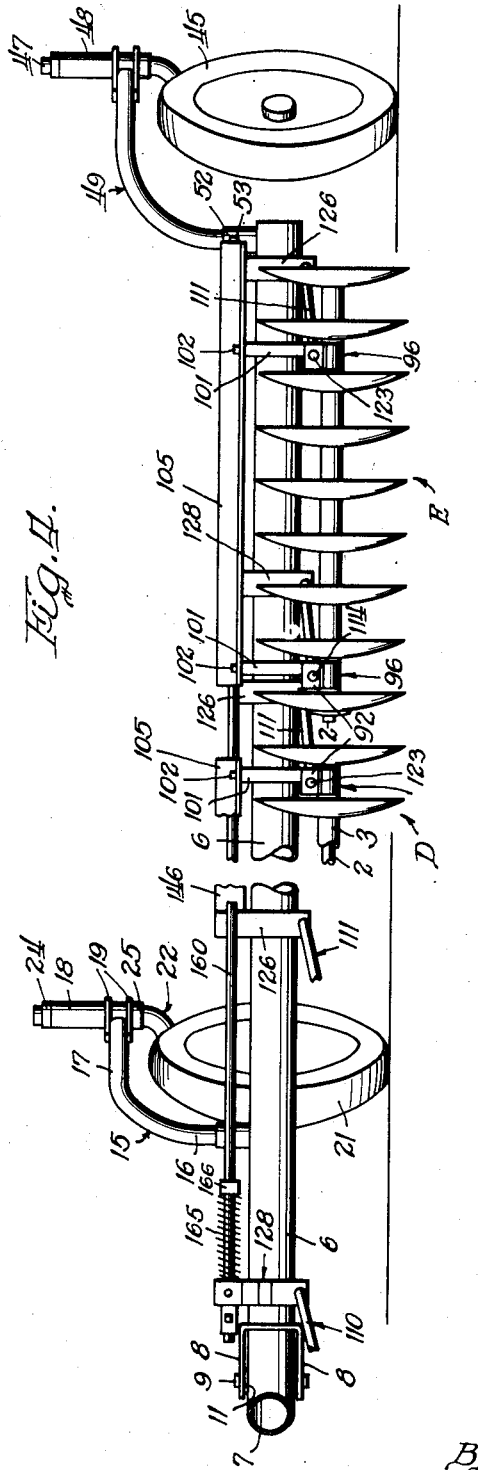
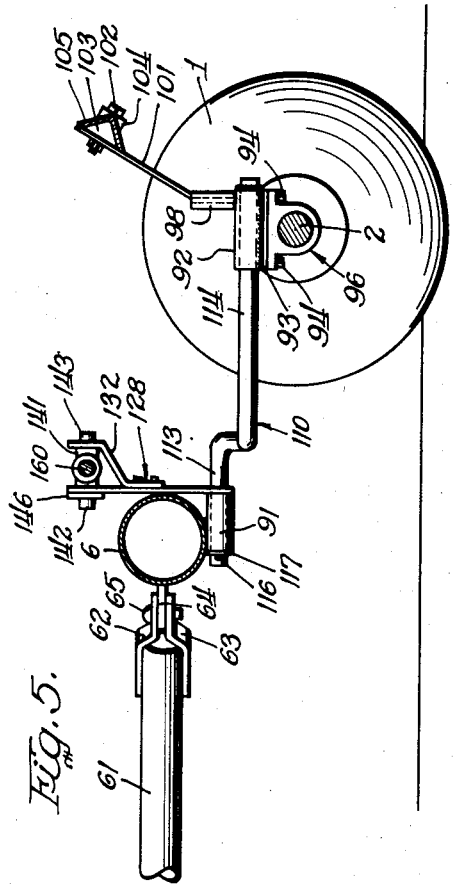
Inventors:
Walter H. Silver,
John I. Cantral.
By [signatures]
Attys.

Aug. 11, 1953     W. H. SILVER ET AL     2,648,270
DISK PLOW WHEELED FRAME
Filed April 18, 1947     5 Sheets-Sheet 4
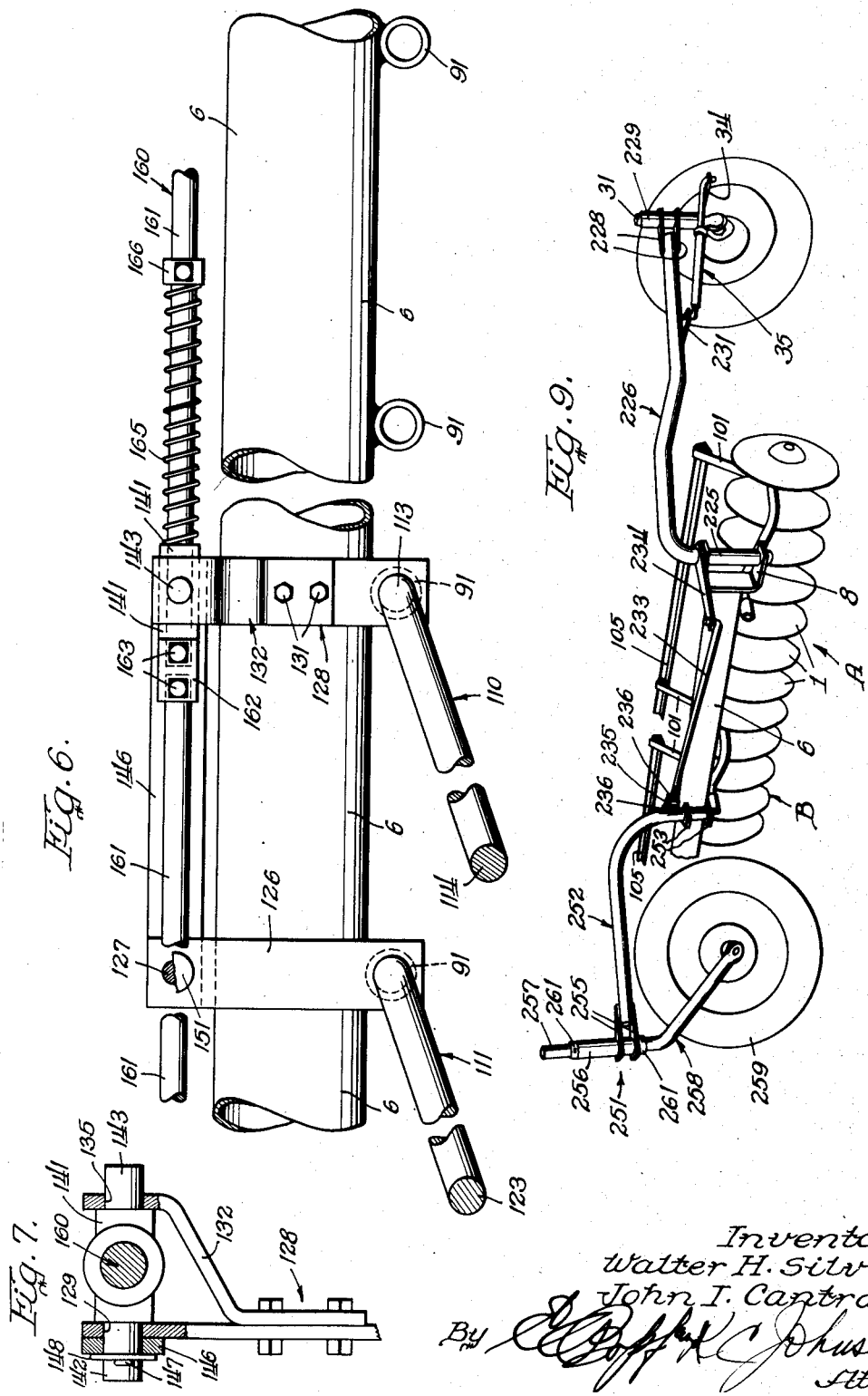
Inventors:
Walter H. Silver,
John I. Cantral.
By
Attys.

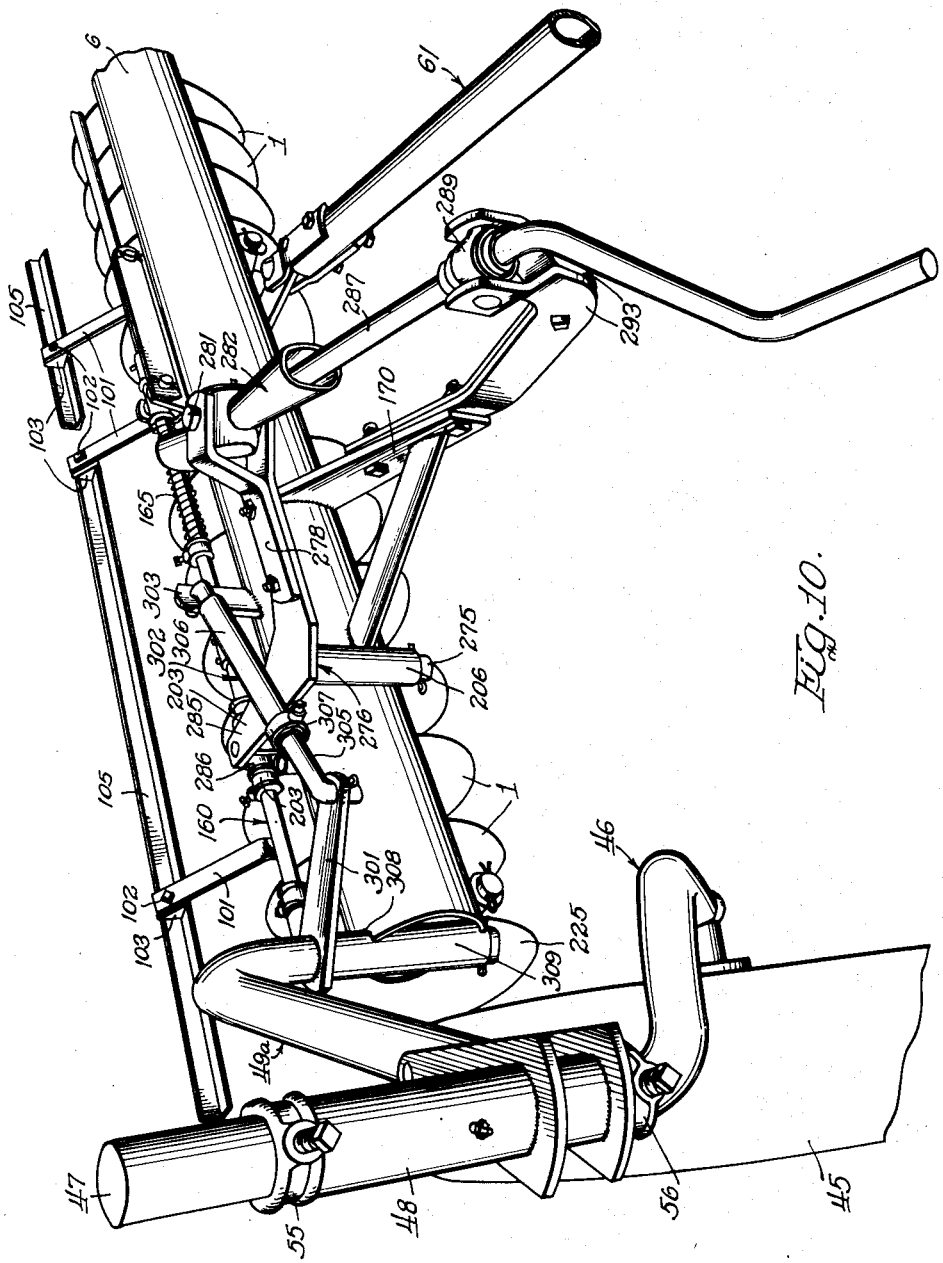

Patented Aug. 11, 1953

2,648,270

UNITED STATES PATENT OFFICE 2,648,270

DISK PLOW WHEELED FRAME

Walter H. Silver and John I. Cantral, Moline, Ill., assignors to Deere & Company, Moline, Ill., a corporation of Illinois Application April 18, 1947, Serial No. 742,234

13 Claims. (Cl. 97—181)

The present invention relates generally to agricultural implements and more particularly to ground working implements of the type commonly known as disk tillers.

The object and general nature of the present invention is the provision of a novel disk tiller having exceptionally large capacity and which is adapted to work a strip of ground much wider than conventional disk tillers. More particularly, it is a feature of this invention to provide a disk tiller or similar implement having a plurality of ground working units, each of which is flexibly mounted so as to operate effectively over ground which is uneven or rough. More specifically, it is an important feature of this invention to provide a ground working implement having a plurality of gangs of disks, wherein the gangs are axially aligned so as to operate over a wide strip of ground and so connected with a supporting frame that one end of each gang unit may rise or fall relative to the other end so as to work the ground at a uniform depth irrespective of humps, hollows or other surface irregularities.

It is also an important feature of this invention to provide means, while accommodating the above mentioned flexible mounting of the disk gangs, especially constructed and arranged to apply downward pressure against the ends of the disk gangs so as to act to force them down into their working position or hold them in a working position. It is an additional feature of this invention to connect the disk gangs in axial alignment so that any tendency for one end of each gang to run too deep is offset by a connection to the adjacent end of the adjacent gang so as to secure thereby substantial uniformity of operation. Specifically, the gang units, which are ordinarily arranged diagonally, have their front and rear ends connected, respectively, with the rear and front ends of the next adjacent gangs, whereby the several gangs may float with respect to the supporting frame but without having either end of any one gang run too deep or too shallow as compared with the other end of that gang.

Another important feature of the present invention is the provision of a new and improved frame structure for a disk implement of the wide spread type, and a further object of this invention is the provision of a new and improved ground wheel support for an implement of this kind.

These and other objects and advantages of the present invention will be apparent to those skilled in the art after a consideration of the following detailed description, taken in conjunction with the accompanying drawings.

In the drawings:

Figure 1 is a plan view of a tractor drawn disk tiller, in which the principles of the present invention have been incorporated.

Figure 2 is an end view, showing the rear or outer end of the disk tiller and the land and furrow wheels therefor.

Figure 3 is an end view at the front of the tiller, showing the front land wheel and associated parts.

Figure 4 is a rear view, looking forwardly generally along the line 4—4 of Figure 1.

Figure 5 is a sectional view taken generally along the line 5—5 of Figure 1, and showing the draft and bearing connections between the tiller frame and the disk gang units.

Figure 6 is a detail view showing the interconnection between the contiguous end portions of adjacent gangs.

Figure 7 is a detail view of the raising and lowering rod connection.

Figure 8 is an enlarged fragmentary perspective showing the hydraulic mounting parts, with the cylinder detached.

Figure 9 is a fragmentary view showing a modified rear end construction.

Figure 10 is a modified view of the front portion of a disk tiller showing a crank screw operated lift instead of a power unit operated lift.

Referring now more particularly to Figure 1, the implement in which the principles of the present invention have been embodied, and illustrated in the drawings by way of example, is a disk tiller comprising a plurality of gangs of disks A. B. etc., each gang made up of a plurality of disks 1 mounted on a gang bolt 2 and held in spaced apart relation by spools or spacers 3, and at the ends of each gang bearing means are provided which will be described in detail below. The gangs of disks are supported in a flexible manner on a main frame that is indicated in its entirety by the reference numeral 5. The frame 5 is made up of a diagonally disposed tubular member 6, preferably of round pipe stock, and a generally fore and aft tubular member 7, also preferably formed of round pipe stock. The rear end of the main tubular member 6 has a bifurcated section 8, the upper and lower arms of which are spaced apart vertically and apertured to receive a pivot pin 9 which connects the member 6 swingably with the member 7. To this end, the central portion of the member 7 may carry a vertical bearing bushing 11 or other suitable construction to receive the pivot pin 9.

A bracket 15 is fixed to the forward end of the landward frame member 7 and includes a rear vertical portion 16 that is secured, as by welding, to the front end of the member 7 and an upper or forwardly extending section 17, to the forward portion of which a sleeve 18 is fixed, as by welding, and reenforced by a pair of gusset plates 19 or the like. A land wheel 21 is carried at the lower end of the support 22, the upper and forward portion of which is formed as a spindle 23 and rotatably disposed in the sleeve 18. Upper and lower set screw collars 24 and 25 are employed for holding the spindle in position while accommodating full castering of the land wheel 21. A rear furrow wheel support 27 is adjustably connected at its forward end to the rear end of the landward frame member 7 and carries a sleeve 28 in which the spindle 29 of a rear furrow wheel axle 31 is received. The axle 31 includes a downward and furrowed extension on which a rear furrow wheel 32 is mounted, and the spindle portion 29 is provided with an arm 34 secured thereto and apertured at its outer end to receive an adjusting link 35 which preferably is made up of two telescopically associated sections 36 and 37, the latter being pivotally connected in any suitable way to the rear end of the landward frame member 7, preferably by means of a plate 38 which is welded to the support 27 and has a plurality of apertures 39 receiving a bolt 41 which is carried by the frame member 7 and which accommodates disposition of the furrow wheel support 27 in different angular positions, whereby it is possible to set the furrow wheel 32 in different positions relative to the frame 5.

The forward end of the diagonal frame member 6 is supported on a forward furrow wheel 45 which is journaled on the lower end of an axle member 46, the upper portion 47 of which is formed as a spindle to receive a sleeve 48 that is carried by the upper forward end of a front wheel support member or bracket 49. The latter may be fixed to the front end of the frame member 6 in the same manner as described above in connection with the land wheel support bracket 15, but preferably the position of the front wheel 49 may be adjusted laterally, and to this end the front end of the main frame member 6 carries a sleeve section 52 which receives the lower and rear portion of the bracket 49, the latter being suitably held in the member 52 in different positions of adjustment by any suitable locking means, such as a set screw 53 or the like. If desired, the land wheel support member 15 may be connected to the front end of the frame member 7 in the manner just described for the bracket 49. The spindle 47 carries set screw collars 55 and 56 at the upper and lower ends of the sleeve sections 49, whereby the front wheel 45 may caster. Also, the vertical position of the frame relative to the wheels 21 and 45 may be adjusted by loosening the set screw collars and shifting them into different positions so as to carry the frame at higher or lower positions, as desired. Generally it is not necessary to adjust the vertical position of the furrow wheel 32, but if so desired, the spindle portion 29 of the axle member 31 may likewise carry set screw collars at opposite ends of the sleeve section 28. The link member 37 preferably carries an adjusting set screw clamp collar 57 engageable with the link section 36, which provides for changing the effective length of the link member 35 so as to change the lead of the rear furrow wheel 32.

The implement frame 5 may be connected to a propelling tractor T by any suitable hitch construction, but preferably, according to the principles of the present invention, a relatively heavy draft member 61 is connected by upper and lower plates 62 and 63 to a draft stud 64 welded to the generally central portion of the main frame member 6. The stud 64 is apertured to receive a draft pin 65 which passes through apertures in the rear ends of the plates 62 and 63. Preferably, the latter plates are bolted to the rear end of the main draft member 61. The forward end of the draft member 61 is connected to the drawbar 71 of the tractor T by a similar construction, embodying upper and lower plates 72 and 73 apertured to receive a hitch pin 74 that connects the front end of the hitch member 61 to the tractor drawbar 71. The plates 72 and 73 preferably are bolted to the front end of the hitch member 61. The latter member is provided with a transverse clip 81 apertured at its opposite ends to receive the downturned ends of angle adjusting rods 82 and 83. The rear end of the hitch rod 82 is received telescopically in a tubular member 86 that is pivotally connected in any suitable way to the forward portion of the main frame member 6, and the rear end of the other hitch rod 83 is likewise received in a tubular member 87 that is pivotally connected to the rear portion of the frame member 6. Clamping set screw collars 88 are provided for holding the members 82, 86 and 83, 87 in different positions of adjustment.

Reference was made above to the fact that the disk gangs A, B, etc., are flexibly connected with the main frame 5 of the implement. These connections will now be described.

Referring particularly to Figure 5, a plurality of transverse bearing sleeves 91 are secured, preferably by welding, to the underside of the main frame pipe 6, and a plurality of companion bearing sleeves 92 are secured to the disk gangs, one for each end portion of each gang. Preferably the gang bearing sleeves 92 are secured directly to the associated gang shaft bearing member 93 as by bolts 94 extending downwardly through openings in an attaching strap 95 to which the bearing sleeve 92 is welded, and connected with the associated disk gang bearing 96. A channeled lug 98 is welded to one end of the bearing sleeve 92 and receives a standard 101. The upper end of the latter is apertured to receive a bolt 102 which extends through a pair of clamping members 103 and 104 between which a scraper support angle 105 is disposed. Scrapers of any suitable construction are mounted on each support angle 105.

A bail member 110 is provided for the rear end of each of the disk gangs A, B, etc., and a similar bail member 111 is provided for the forward end of each of said disk gangs. Each rear bail member 110 comprises a generally horizontally disposed arm having its forward end bent forwardly, as indicated at 113, and disposed within the associated main frame bearing sleeve 91. The rear end of the arm member is bent rearwardly, as at 114, and is disposed in the associated disk gang bearing sleeve section 92. Each end of the bail arm is apertured to receive a cotter 116 which, in conjunction with a thrust washer 117, serves to hold the bail in place and take all draft pull transmitted between the frame and that end of the disk gang. The other bail or arm 111 which connects the other end of each gang to the main frame 5 is of similar construction, embodying a bail having a forwardly turned end 122 rockably disposed in the cooperating bearing sleeve section 91 carried by the main frame pipe member 5. The other end of the arm 111 carries a generally rearwardly directed section 123 which is received by the cooperating bearing section 92 mounted on the disk gang bearing unit in the same manner as described above. The several arms 111 employ generally vertically extending sections 126 which are apertured, as at 127, at their upper ends, and the several companion arm or bail members 110 are provided with generally upwardly extending arm sections 128 which are also apertured at their outer ends, as at 129, and are also provided with a pair of apertures to receive bolt or rivet means 131 connecting a hammer strap 132 thereto (Figure 7). The outer end of the hammer strap 132 is apertured, as at 135, and the apertures 129 and 135 of each arm or bail member 111 pivotally carry a sleeve 141 swiveled by trunnions 142 and 143 received, respectively, in the apertures 129 and 135. As best shown in Figure 6, the bail member 110 connected with the rear end of one gang is connected with the adjacent bail member 111 that is connected with the forward end of the next rearward gang by a link 146, the ends of which are apertured and are pivotally mounted on an extension of the trunnion 142, being held in place thereon by a cotter 147 and a thrust washer 148. The other end of the link 146 is apertured to receive a pivot 151 which connects the link 146 with the upwardly extending arm section 126 on the associated bail member 110. Thus, by virtue of the links 146, we have provided a plurality of disk gangs connected together in generally axial relation whereby each gang may have floating action more or less independently of the other gangs but with the rear end of each gang connected to the forward end of the adjacent gang whereby the adjacent ends of the gangs rise and fall together, yet the entire assembly of interconnected disk gangs move upwardly or downwardly so as to accommodate uneven ground and the like.

A generally longitudinally shiftable raising and lowering rod member 160 is carried in the several sleeves 141, and the rod member 160 may, if desired, be made up of a plurality of rod sections 161 interconnected at their ends by connecting sleeves 162 bolted, as at 163, to the rod sections 161. The raising and lowering rod member 160 carries a compression spring 165 on the forward side of each of the swiveled sleeves 141, and an adjustable set screw collar 166 is disposed on the rod member so as to form an abutment receiving one end of the compression spring 165, the other end of which bears directly against one end of the associated swiveled sleeve 141. Preferably, the interconnecting collars 162 are disposed on the rearward or landward side of each of the swivel sleeves 141 whereby when the rod member 160 is moved to the right (Figures 1, 4 and 6), the interconnecting sleeves 162 engage the associated swiveled sleeves 141 and serve thereby, acting through the bail connecting links 146, to rock all of the bails 110 and 111 in a direction to raise the disk gangs out of engagement with the ground and into a transport position. By moving the rod member 160 in the other direction, the disk gangs are lowered into operating position and, if the rod member 160 is forced landwardly, the springs 165 are compressed and apply a yielding downward pressure against the bails for yieldably holding the disks to their work. Also, the yielding of the springs 165 when the implement is arranged for operation permits the disk gangs more or less individually to rise and fall when passing over uneven ground.

According to the principles of the present invention, we provide hydraulically operated means for shifting the raising and lowering rod 160, and to this end a cylinder support bracket 170 is fixed to the forward side of the main frame pipe member 6, being reenforced by a brace 171 (Figure 8) welded to the pipe 6 and the forward portion of the support 170. The latter is apertured to receive bolt means 173 by which a cylinder support strap 174 is secured to the support lug 170 in a forwardly disposed position. The support strap 174 includes an upwardly turned forward end 175 apertured to receive a quick detachable pin 176 (Figure 1) connected to the forward end of the hydraulic piston and cylinder unit 177 thereto. The rear or piston end of the power unit 177 is connected by a quick detachable pin 179 to a link 181 pivotally mounted, as at 182, on a bell crank lever 183. Preferably, the bell crank lever 183 includes a vertically disposed pivot pin 185 welded to the main arm member 186 and also welded to a short bar 187 disposed in spaced relation with respect to the main bell crank member 186. The outer end of the bar 187 is welded to a stop abutment 188 which is also welded to an edge of the main bell crank member 186. The member 188 forms a stop limiting movement of the arm 181 relative to the bell crank 183 in one direction, and when the arm 181 is disposed up against the stop 188, an opening 191 in the outer end of the bar 187 comes into registration with a similar opening 192 formed in the arm 181 and an opening 193 in the adjacent portion of the main bell crank lever member 186. A pin 194 (Figure 1) when inserted through the registering openings 191, 192 and 193 locks the parts together. The outer end of the lever 181 is apertured, as at 195, to receive the rear quick detachable pin 179 connecting the cylinder unit 177 to the arm 181. The other end of the bell crank lever 183 carries a swiveled sleeve 201 through which the forward end of the raising and lowering rod member 160 passes, and a pair of set screw collars 203 are fixed to the lifting rod section and form the means whereby oscillation of the bell crank lever 183 shifts the raising and lowering member 160 in one direction or the other. When the pin 194 is in place, connecting the swinging arm 181 with the bell crank lever 183, the cylinder 177 may be retracted or extended to oscillate the bell crank lever 183 by power in one direction or the other, raising or lowering the disks. The pin 185 of the bell crank lever 183 is received in a vertical sleeve 206 welded to the front portion of the main frame pipe 6.

In Figure 9 we have shown a modified rear end construction wherein the forward downturned end 225 of a rear furrow wheel axle member 226 is disposed in the rear bifurcated section 8 of the main pipe member 6. The axle member 226 extends rearwardly and carries a pair of upper and lower brackets 228 to which a vertical bearing sleeve 229 is fixed, as by welding. The sleeve 229 receives the spindle 31 of the rear furrow wheel, and the angle or lead of the latter is adjusted, in this form of the invention, in substantially the same way as described above, namely, by a telescopically associated pair of link members 35 pivotally connected at their forward ends to a lug 231 fixed, as by welding, to the rear axle member 226 and to the steering arm 34. The lateral position of the rear end of the axle member 225 is adjusted by means of a link 233, the rear end of which is turned upwardly and disposed in and apertured in a lug 234 welded to the rear axle member 226, the forward end of the link being threaded and extended through an opening in an angle lug 235 that is welded to the upper side of the main pipe member 6. Lock nuts 236 serve to hold the link 233 in different positions of adjustment.

Also, instead of or in addition to the set screw 53 (Figure 4), the front axle member 49 may be held in different positions of lateral adjustment by means of an arm and link construction substantially the same as the members 233 and 234 and associated parts, as just described.

The form of the invention shown in Figure 9 also includes a modified form of landwheel support which will now be described. A land axle bracket 251 includes an L-shaped bar 252 having its rear end turned downwardly and secured, as by welding, in a pair of brackets 253 that are welded to the forward side of the pipe member 6. The main portion of the bracket member 252 extends forwardly and receives a pair of lugs 255 which are welded to the bar 252 and which, in turn, are welded to the lower end of a spindle-receiving sleeve 256. The sleeve 256 receives the spindle section 257 of a land axle member 258 upon which the land wheel 259 is journaled. A pair of set screw collars 261 serve to hold the spindle section 257 in different vertical positions. It will be noted that in this form of the invention the land wheel 259 is disposed generally toward the intermediate portion of the frame, thereby providing for support of the latter at a point between its ends. This serves to prevent undue sagging of the frame during transport when the weight of the plurality of gangs is sustained by the frame.

For use with tractors that do not include a remote hydraulic cylinder, we provide a crank screw or hand operated type of lift which will now be described. Referring now to Figure 10, a pin 275 forming a part of a bell crank lever 276 is received by the vertical sleeve 206 that is fixed to the front portion of the main frame pipe 6. The bell crank lever 276 includes a hammer strap 278 which is apertured, together with the adjacent portion of the bell crank arm section 279, to which the hammer strap is fixed, thereby forming means for receiving the trunnion sections 281 of a depth screw housing member 282. The other arm section 285 of the bell crank 276 receives a swivel member 286 through which the forward end of the raising and lowering rod member 160 passes, being held in proper relation with respect thereto by the set screw collars 203 mentioned above.

The housing member 282 receives a nut (not shown) which receives the rear threaded end of the depth screw adjusting crank 287, the forward portion of which is journaled for rotation in a swivel 289, the trunnions 291 of which are received in the upper or forward apertured ends of a pair of bracket straps 293 that are bolted to the support bracket 170 in place of the cylinder support member 174 described above. Turning the crank screw 287 in one direction or the other swings the bell crank 276 and thus raises or lowers the disks in substantially the same way as described above in connection with the form of the implement using the hydraulic cylinder.

In this form of the invention the front axle member 49a is held in different positions of lateral adjustment by means of an arm 301 welded to the rear portion of the front axle member 49 and an adjustable link member 302 connected between the end of the arm 301 and an apertured lug 303 on the main frame member 6. Preferably, the adjustable link structure 302 includes a pair of telescopically associated sections 305 and 306 held in different positions by a set screw collar 307. Also in this form the front end of the pipe 6 is notched, as at 308, to receive the sleeve 309, welded thereto, in which the axle 49a is disposed for lateral swinging.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A disk tiller or the like, comprising a generally diagonally disposed frame member, soil-working disks, brackets rotatably receiving said disks and rigidly fixed to said frame, a laterally rigid hitch connected with said frame, front and rear wheel supports fixed to the front and rear ends of said diagonal member, respectively, said rear wheel support having a rear portion, a rear furrow wheel, axle means therefor movably connected with said rear support for movement relative thereto about a generally vertical axis, means fixedly connecting said axle means with the rear portion of said rear wheel support so that the wheel may be given a lead away from said disks and thus act against the soil to counteract end thrust against said disks transmitted to said frame member, said connecting means including relatively shiftable parts whereby changing the position of one part relative to the other will change the angle of lead of said rear furrow wheel, front furrow and land wheels connected with said wheel supports, and means connecting said front furrow and land wheels with said wheel supports for relatively free castering movement about vertical axes relative to said frame member.

2. A disk tiller comprising a frame including a diagonal member, soil-working disks carried thereby, and generally fore and aft extending wheel-receiving means adjustably connected at an intermediate point with the rear portion of said diagonal frame member, a forward furrow wheel connected with the forward end of said diagonal member, an L-shaped bracket fixed at its rear end to the forward end of said wheel-receiving means and including an upper and forwardly extending portion, a land wheel connected for castering movement to the forward end of said last mentioned portion and swingable under the latter when castering, a rear furrow wheel, axle means therefor, and means rigidly connecting said axle means with the rear portion of said wheel-receiving means, said connecting means being adjustable so that the wheel may be given a lead away from said disks and thus act against the soil to counteract end thrust against said disks, said connecting means being adjustable for changing the lead of said rear furrow wheel.

3. An agricultural implement comprising a frame including a diagonal member, a generally forwardly extending bracket connected at its rear end with the forward end portion of said diagonal member, a front furrow wheel, means connecting the front furrow wheel with said forwardly extending bracket, a rearwardly extending bracket connected at its forward end with the rear portion of said diagonal member, a rear furrow wheel having a spindle mounted in the rear portion of said rearwardly extending bracket for movement relative thereto to change the angle of lead of said wheel, means for fixing said wheel in different positions generally transversely of said rearwardly extending bracket, a forwardly extending land wheel bracket fixed to said diagonal frame member at a point laterally inwardly of said rear wheel bracket, a land wheel, and means connecting said land wheel with the forward end of said land wheel bracket for castering action.

4. In a disk tiller, a frame including a generally diagonally extending member, a pair of vertically spaced forwardly extending apertured lugs carried by said member between the ends thereof and at the forward side thereof, a wheel-receiving bracket connected with said frame and including a rear downwardly extending portion disposable in the apertures of said forwardly extending lugs for lateral swinging movement and including an upper section extending in a generally fore and aft direction, wheel means carried by the upper forwardly extending portion of said bracket, and means fixing the rear lower portion of said wheel-receiving bracket to said apertured forwardly extending lugs so as to hold said wheel bracket against lateral swinging relative to said frame member.

5. The invention set forth in claim 4, further characterized by a caster wheel connected with the upper forwardly extending end of said bracket and freely swingable laterally with respect thereto and underneath said upper forwardly extended end in operation.

6. The invention set forth in claim 4, further characterized by the upper forwardly extending portion of said wheel-receiving bracket having fixed thereto a pair of vertically spaced, forwardly extending apertured lugs, a vertically extending sleeve fixed in said lugs, spindle means disposed for rocking movement about a vertical axis in said sleeve and connecting said wheel with the outer end of said bracket to accommodate swinging of said wheel relative thereto about said generally vertical axis and generally underneath said upper forwardly extending bracket portion, and a pair of set screw collars fixed to said spindle means above and below said sleeve for holding said spindle means in different positions of vertical adjustment relative to said bracket.

7. A disk tiller comprising a generally diagonally disposed frame member, soil-working disks, standards rotatably receiving said disks and fixed to said frame member, a hitch frame rigidly connected with said frame member, generally fore-and-aft extending, front and rear wheel-supporting members fixed, respectively, to the front and rear end portions of said diagonal member, a rear furrow wheel, axle means for said rear furrow wheel connected with one of said supporting members for movement relative thereto, means fixedly connecting said rear furrow wheel axle means with the rear portion of said rear wheel supporting member so that the wheel may be given a lead away from said disks and thus act against the soil to counteract end thrust against said disks, said connecting means including relatively movable parts adapted to be interconnected in different positions, thereby serving as means for changing the angle of lead of said rear furrow wheel, front furrow and land wheels connected, respectively, with said wheel-receiving supporting members, and means connecting said land wheel with the front wheel supporting member for relatively free castering movement about a vertical axis relative to the diagonally disposed frame member.

8. An agricultural implement comprising a frame including a diagonal member, soil-working means carried thereby, a pair of wheel-receiving means connected with the rear portion of said diagonal frame member and extending forwardly and rearwardly therefrom, respectively, a forward furrow wheel connected with the forward end of said diagonal member, the forwardly extending wheel-receiving means including an L-shaped bracket fixed at its rear end to said diagonal member and including an upper and forwardly extending portion, a land wheel connected for castering movement to the forward end of said last mentioned portion and swingable under the latter when castering, a rear furrow wheel, and means connecting the latter with the rearwardly extending wheel-receiving means so that the wheel may be given a lead away from said soil-working means and thus act against the soil to counteract end thrust against said soil-working means, said connecting means including relatively adjustable parts adapted to be fixed together in different positions, thereby serving as means for adjusting the lead of said rear furrow wheel.

9. An agricultural implement comprising a frame including a diagonal member, a forwardly extending bracket connected at its rear end with the forward end of said diagonal member, a front furrow wheel, means connecting the front furrow wheel with said forwardly extending bracket, a rearwardly extending bracket connected at its forward end with the rear portion of said diagonal member, a rear furrow wheel having a spindle mounted in the rear portion of said rearwardly extending bracket for movement relative thereto to change the angle or lead of said wheel, means connected with said rear furrow wheel spindle and said rearwardly extending bracket for fixing said wheel in different positions relative to said latter bracket, a forwardly extending land wheel bracket fixed to said diagonal frame member at a point laterally inwardly of said rear wheel bracket, a land wheel, and means connecting said land wheel with the forward end of said land wheel bracket for castering action.

10. In an agricultural implement, a frame including a generally diagonally extending member, a pair of vertically spaced, forwardly extending apertured lugs carried by said member between the ends thereof and at the forward side thereof, a wheel-receiving bracket connected with said frame and including a rear downwardly extending portion disposable in the apertures of said forwardly extending lugs for lateral swinging movement and including an upper section extending in a generally fore-and-aft direction, wheel means carried by the upper forwardly extending portion of said bracket, and means fixing the rear lower portion of said wheel-receiving bracket to said apertured forwardly extending lugs so as to hold said wheel bracket against lateral swinging relative to said frame member.

11. In a disk tiller, a frame including a generally diagonally extending member, a pair of vertically spaced, forwardly extending apertured lugs carried by said member between the ends thereof and at the forward side thereof, a wheel-receiving bracket connected with said frame and including a rear downwardly extending portion disposable in the apertures of said forwardly extending lugs for lateral swinging movement and including an upper section extending in a generally fore-and-aft direction, wheel means carried by the upper forwardly extending portion of said bracket, means fixing the rear lower portion of said wheel-receiving bracket to said apertured forwardly extending lugs so as to hold said wheel bracket against lateral swinging relative to said frame member, the upper forwardly extending portion of said wheel-receiving bracket having fixed thereto a pair of vertically spaced, forwardly extending apertured lugs, a vertically extending sleeve fixed in said lugs, spindle means disposed for rocking movement about a vertical axis in said sleeve and connecting said wheel with the outer end of said bracket to accommodate swinging of said wheel relative thereto about said generally vertical axis and generally underneath said upper forwardly extending bracket portion, and means connected with said spindle means above and below said sleeve for holding said spindle means against vertical displacement in said sleeve.

12. A disk tiller comprising a generally diagonally disposed frame member, generally fore-and-aft extending, front and rear wheel-supporting members fixed, respectively, to the front and rear end portions of said diagonal member, a rear furrow wheel, axle means for said rear furrow wheel connected with one of said supporting members for movement relative thereto, means fixedly connecting said rear furrow wheel axle means with the rear portion of said rear wheel supporting member so that the wheel may be given a lead away from said disks and thus act against the soil to counteract end thrust against said disks, said connecting means including relatively movable parts adapted to be interconnected in different positions, thereby serving as means for changing the angle of lead of said rear furrow wheel, front furrow and land wheels connected, respectively, with said wheel-receiving supporting members, and means connecting said land wheel with the front wheel supporting member for relatively free castering movement about a vertical axis relative to the diagonally disposed frame member.

13. A disk tiller or the like, comprising a generally diagonally disposed frame member, soil-working disks, means rotatably receiving said disks and connected with said frame so as to transmit end thrust from said disks to said frame, front and rear wheel supports fixed to the front and rear ends of said diagonal member, respectively, said rear wheel support having a rear portion, a rear furrow wheel, axle means therefor movably connected with said rear support for movement relative thereto about a generally vertical axis, means fixedly connecting said axle means with the rear portion of said rear wheel support so that the wheel may be given a lead away from said disks and thus act against the soil to counteract end thrust against said disks transmitted to said frame member, said connecting means including relatively shiftable parts whereby changing the position of one part relative to the other will change the angle of lead of said rear furrow wheel, front furrow and land wheels connected with said wheel supports, means connecting said front furrow wheel with said front wheel support, and means connecting said land wheel with said frame member for relatively free castering movement about a vertical axis relative to said frame member.

WALTER H. SILVER.
JOHN I. CANTRAL.

References Cited in the file of this patent

UNITED STATES PATENTS

| Number | Name | Date |
|---|---|---|
| 813,446 | Piper | Feb. 27, 1906 |
| 967,093 | Waterman | Aug. 9, 1910 |
| 990,641 | Donald | Apr. 25, 1911 |
| 1,226,793 | Morgan | May 22, 1917 |
| 1,823,508 | Paul | Sept. 15, 1931 |
| 1,944,674 | Silver | Jan. 23, 1934 |
| 2,113,556 | De Rocher | Apr. 5, 1938 |
| 2,245,374 | White | June 10, 1941 |
| 2,370,374 | Silver | Feb. 27, 1945 |
| 2,376,455 | Silver | May 22, 1945 |
| 2,377,410 | Field | June 5, 1945 |